Dec. 18, 1956    W. FERRIS    2,774,434
STEERING CONTROL FOR INDUSTRIAL TRUCK
WITH HYDRAULIC WHEEL DRIVE MOTORS
Original Filed Sept. 28, 1951    3 Sheets-Sheet 1
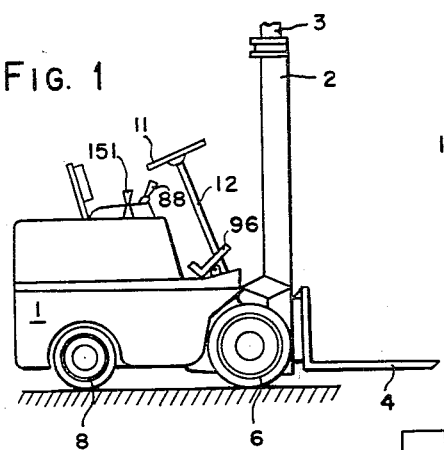
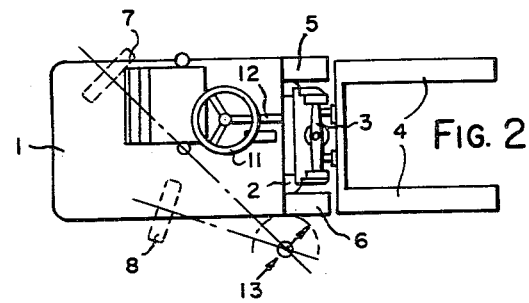
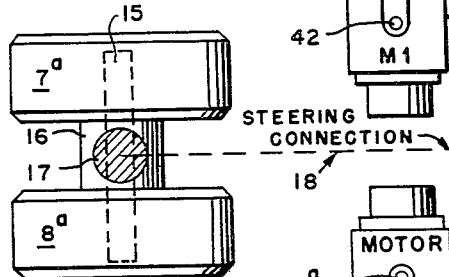
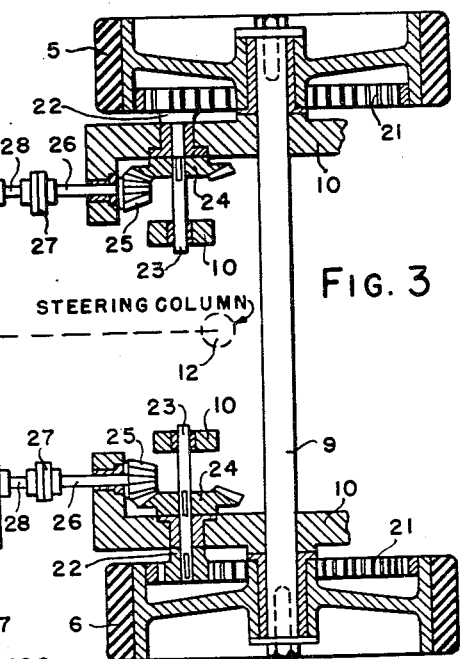
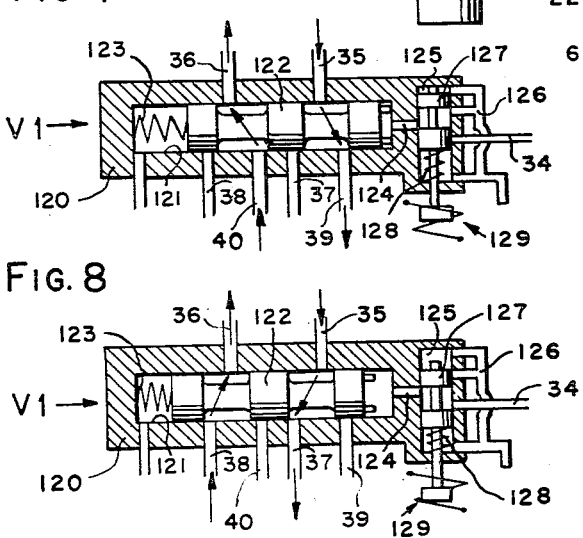
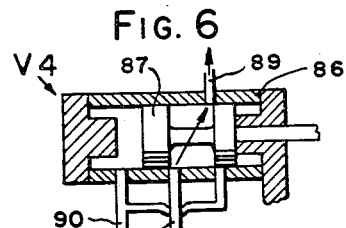
INVENTOR.
WALTER FERRIS
BY
*Wesley P. Merrill*
ATTORNEY

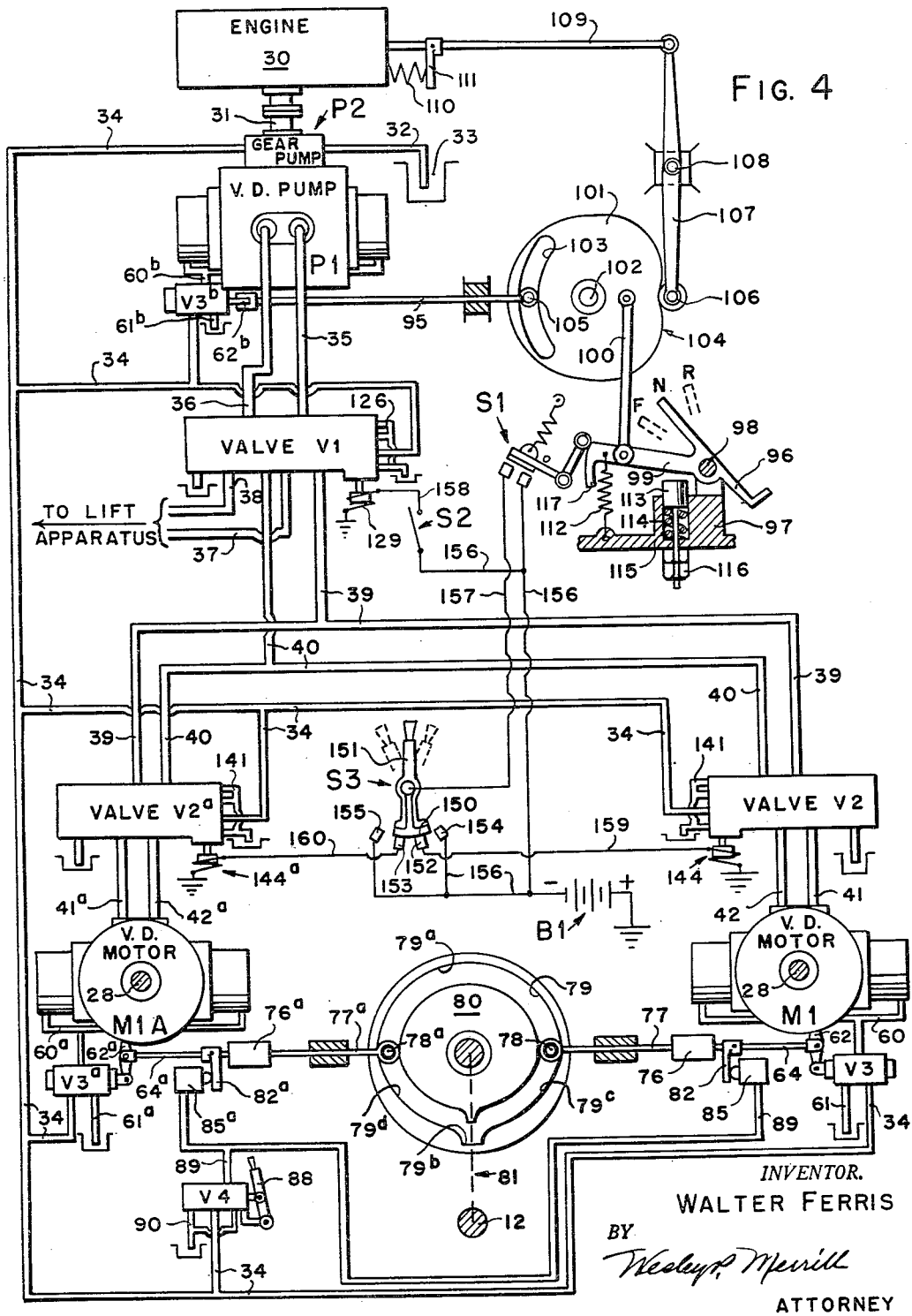

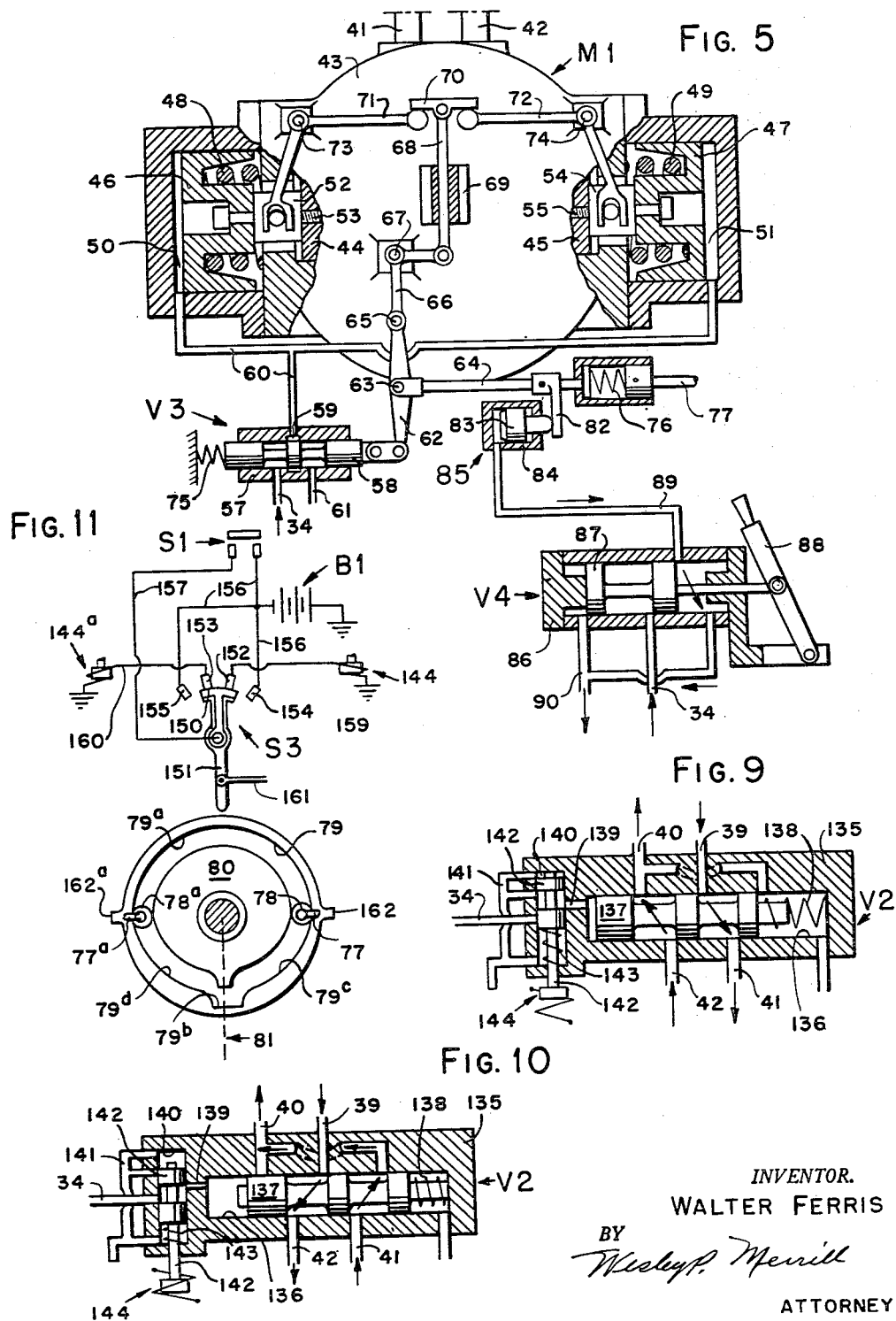

2,774,434

Patented Dec. 18, 1956

2,774,434

STEERING CONTROL FOR INDUSTRIAL TRUCK WITH HYDRAULIC WHEEL DRIVE MOTORS

Walter Ferris, Milwaukee, Wis., assignor to The Oilgear Company, Milwaukee, Wis., a corporation of Wisconsin Original application September 28, 1951, Serial No. 248,830. Divided and this application May 11, 1953, Serial No. 354,233

13 Claims. (Cl. 180—6.3)

This application is a division of application Serial No. 248,830, filed September 28, 1951.

The invention relates to drives for automotive industrial trucks. A drive constructed according to the invention is particularly adapted to drive an industrial truck of the type which will lift a load from any height within certain limits, move the load to a new location and place the load at any height within those limits. Such trucks are well known and in extensive use.

The present invention has as an object to provide a hydraulic drive for industrial trucks.

Another object is to provide a truck drive which may be easily operated and controlled.

Another object is to provide a truck drive having means for reducing the effort required to steer the truck.

Other objects and advantages will appear from the following description of the truck drive shown schematically in the accompanying drawings in which the views are as follows:

Fig. 1 is a side view of one type of industrial truck to which the invention may be applied.

Fig. 2 is a top plan view of the truck shown in Fig. 1 but with the rear wheels turned into position to enable the truck to make the sharpest possible turn.

Fig. 3 is a view showing a part of the drive applied to the front wheels of the truck and also showing a different arrangement of the rear wheels whereby the truck may be turned about the center of the front axle.

Fig. 4 is a diagram of the hydraulic and electric circuits of a drive embodying the invention.

Fig. 5 is a view illustrating the displacement varying mechanism of one of the hydraulic motors, the control mechanism shown being on the far side of the motor shown in the lower right hand portion of Fig. 4.

Fig. 6 is a view illustrating a different position of one of the valves shown in Fig. 5.

Figs. 7 and 8 are views illustrating the functions of the selector valve shown in Fig. 4.

Figs. 9 and 10 are views illustrating the functions of each of the two reversing valves shown in Fig. 4.

Fig. 11 illustrates another manner of operating one of the switches shown in Fig. 4.

The truck shown in Figs. 1 and 2 includes a body 1 which carries the operating and control mechanism, a vertical guide 2 which is supported upon the front end of body 1, a slide 3 which is closely fitted in guide 2 for vertical movement and a pair of forks 4 which are fixed to slide 3.

Body 1 is supported by a pair of rubber tired front wheels 5 and 6 and by a pair of rubber tired rear wheels 7 and 8. Front wheels 5 and 6 are connected to the driving mechanism of the truck and rotate upon opposite ends of a front axle 9 (Fig. 3) carried by the frame 10 of body 1. Each of rear wheels 7 and 8 rotates upon a separate axle which is pivotally supported by body 1. Steering of the truck is effected by turning a steering wheel 11 fixed to the upper end of a steering column 12 which is connected to the rear wheels 7 and 8 by suitable steering connections not shown.

The arrangement is such that the truck may be advanced and steered to direct forks 4 beneath a load and then the forks may be raised to lift the load. The truck may then be moved until the load is over a desired location after which forks 4 may be lowered to deposit the load in that location. Since such trucks are well known and in extensive use, further illustration and description of a conventional truck is deemed unnecessary.

When the rear wheels are mounted upon separate pivotally supported axles and are turned as far as possible as indicated in Fig. 2, the truck will make a right angle turn about a point which is on the axis of the front wheels and is spaced some distance from the truck, as indicated at 13 in Fig. 2. However, a truck may have its rear wheels so arranged that the truck will make a right angle turn about the center of its front axle and thereby require less space for turning.

As indicated in Fig. 3, the truck may be provided with a pair of rear wheels 7a and 8a which are arranged close together and are mounted upon an axle 15 carried by a bearing block 16. The rear part of body 1 is supported from bearing block 16 by means of a support 17 which is connected to steering column 12 by a suitable drive or steering connection 18. Support 17 is connected to frame 10 of body 1 and to bearing block 16 in such a manner that it may be rotated by drive 18 but cannot move in any other direction relatively to body 1 and rotation of support 17 will cause rear wheels 7a and 8a to turn about the vertical axis of support 17. Preferably, the connection between block 16 and support 17 is such that, when the truck is on or moving over an uneven surface, rear axle 15 may tilt in order to permit both rear wheels to remain in contact with that surface. It is also possible to mount the two rear wheels on separate axles as in the conventional truck shown in Fig. 2, to support the two rear axles in such a manner that they may be turned parallel to the truck body and to connect the rear axles to steering column 12 by steering connections through which the rear axles may be turned through an angle of 90° but the arrangement shown in Fig. 3 is much simpler.

The particular arrangement for supporting body 1 upon the rear wheels has not been illustrated nor described in detail because any suitable construction may be employed which will permit the rear wheels to turn about the center of the rear axle so that, when the rear wheels are turned at right angles to the longitudinal centerline of body 1, the truck will turn about the center of the front axle.

Front wheels 5 and 6 are adapted to be driven, respectively, by two identical reversible variable displacement hydraulic motors M1 and M1A each of which is connected to a wheel by a suitable drive. As shown, wheel 5 has an internal gear 21 fixed thereto and in mesh with a pinion 22 fixed upon a shaft 23 which is journaled in frame 10. Shaft 23 has a bevel gear 24 fixed thereon and in mesh with a bevel pinion 25 fixed upon a shaft 26 which is journaled in frame 10 and is connected by a coupling 27 to the shaft 28 of motor M1. The drive for wheel 6 is the same as the drive for wheel 5 and like parts have been indicated by like reference numerals so that further description thereof is unnecessary.

As indicated in Fig. 4, liquid for energizing motors M1 and M1A is supplied by a variable displacement main pump P1 which is driven by an internal combustion engine 30 as by means of a shaft 31. Liquid for control purposes is supplied by a gear pump P2 which draws liquid through a channel 32 from a reservoir 33 and discharges liquid into a branched supply channel 34. Gear pump P2 is driven in unison with pump P1 and is arranged within the casing thereof according to common practice. The liquid discharged by gear pump P2 in excess of requirements is exhausted into reservoir 33 through a relief valve (not shown) which is arranged within the pump casing according to the usual practice and which enables pump P2 to maintain a constant low pressure in channel 34.

For the purpose of illustration, reservoir 33 has been shown separate from pump P1 but in practice it is either arranged within the casing of pump P1 or it constitutes a base upon which pump P1 is mounted, as is customary, so that leakage from pumps P1 and P2 may drain directly into reservoir 33. Liquid for making up leakage losses is supplied to the intake of pump P1 either directly from reservoir 33 or by gear pump P2.

Pump P1 is adapted to discharge liquid through a channel 35 and to have liquid returned to it through a channel 36. Channels 35 and 36 are connected to a hydraulically operated and electrically controlled selector valve V1 which also has a pair of channels 37 and 38 and a pair of channels 39 and 40 connected thereto. Channels 37 and 38 are adapted to direct liquid to and from the apparatus for operating the lifting mechanism of the truck which apparatus has not been illustrated nor described as it forms no part of the present invention. Channels 39 and 40 are each connected to two hydraulically operated and electrically controlled reversing valves V2 and V2ª which control the direction of operation of motors M1 and M1A respectively. Valve V2 is connected to motor M1 by two channels 41 and 42, and valve V2ª is connected to motor M1A by two channels 41ª and 42ª.

Motors M1 and M1A preferably are of the vane type and may be similar to the motor shown in Patent No. 2,630,681 to which reference may be had for details of construction. Since motors M1 and M1A are identical, a description of one will suffice for both.

As indicated in Fig. 5, motor M1 has its mechanism arranged within a casing 43 to which channels 41 and 42 are connected. The mechanism of motor M1 includes two identical displacement varying members 44 and 45 which are adapted to be adjusted, respectively, by two pistons 46 and 47 which are urged outward, respectively, by two springs 48 and 49, and are fitted, respectively, in two cylinders 50 and 51 which are fixed to opposite sides of casing 43. Member 44 and piston 46 are held in firm engagement with opposite ends of a spacer block 52 by a bolt 53. Likewise, member 45 and piston 47 are held in firm engagement with opposite ends of a spacer block 54 by a bolt 55. Springs 48 and 49 normally hold members 44 and 45 in such positions that motor displacement is maximum.

Pistons 46 and 47, cylinders 50 and 51 and springs 48 and 49 constitute hydraulic servo-motor means which when supplied with motive liquid will decrease the displacement of motor M1 and when connected to exhaust will increase the displacement of motor M1 as will presently be explained.

Operation of the servo-motor means is controlled by a pilot valve V3 comprising a body 57 having an axial bore and a valve 58 fitted therein. Valve body 57 has an annular groove or port 59 formed in the wall of its bore and connected by a channel 60 to both of cylinders 50 and 51. Valve 58 controls communication between port 59 and an exhaust channel 61 and between port 59 and a branch of gear pump supply channel 34.

The other internal mechanism of the motor has not been illustrated as it is only necessary to state that, when valve 58 is shifted toward the right from the position shown, liquid will flow from channel 34 through valve body 57 and channel 60 to cylinders 50 and 51 and cause pistons 46 and 47 to move members 44 and 45 radially inward to thereby decrease the displacement of the motor and, when valve 58 is shifted toward the left from the position shown, the pressure in cylinders 50 and 51 is reduced so that springs 48 and 49 can cause pistons 46 and 47 to move members 44 and 45 radially outward to increase the displacement of the motor, liquid being ejected by pistons 46 and 47 from cylinders 50 and 51 through channel 60 and valve body 57 into exhaust channel 61.

The center piston on valve 58 has been shown as being of the same length as port 59 because the valve is shown on too small a scale to illustrate the usual construction. That is, the piston usually is made longer than the port and is provided at each of its ends with tapered grooves to thereby obtain more accurate regulation of the rate at which liquid can flow through the port.

Valve 58 normally occupies a neutral position as shown and it is operated through a suitable follow-up mechanism which, after the valve has been shifted to effect movement of pistons 46 and 47, causes the valve to be returned to its neutral position in response to the movement of pistons 46 and 47. As shown, valve 58 is pivotally connected to one end of a floating lever 62 which is pivoted intermediate its ends upon a pin 63 arranged in one end of a control rod 64. The other end of lever 62 is connected by a pin 65 to one arm of a bell-crank lever 66 which is pivoted upon a stationary pin 67. The other arm of lever 66 is pivoted to one end of a link 68 which is slidable in a guide 69 and has an equalizer 70 pivoted to its other end. Equalizer 70 is engaged by the free ends of two bell-crank levers 71 and 72 which are pivoted, respectively, upon stationary pins 73 and 74 and have the other ends thereof pivoted to spacer blocks 52 and 54 respectively. All lost motion in the follow-up mechanism is taken out in any suitable manner such as by means of a spring 75 which urges valve 58 toward the right in respect to Fig. 5.

The arrangement is such that, when control rod 64 is moved toward the right in respect to Fig. 5, lever 62 will pivot upon pin 65 and will move valve 58 toward the right from its neutral position. As soon as valve 58 leaves its neutral position, liquid will flow to cylinders 50 and 51 and will move pistons 46 and 47 inward to decrease motor displacement as previously explained. Spacer blocks 52 and 54 will move inward with the pistons and will cause levers 71 and 72 to pivot upon pins 73 and 74 and to raise equalizer 70 and link 68 which will cause lever 66 to pivot upon pin 67 and move the upper end of lever 62 toward the right so that, as soon as movement of control rod 64 ceases, lever 62 will pivot upon pin 63 and return valve 58 to its neutral position. The sum of the movements of pistons 50 and 51 and consequently the variation in the displacement of the motor, is thus proportional to the distance through which control rod 64 is moved.

When control rod 64 is moved toward the left, the displacement varying mechanism will operate substantially in the above described manner except that motor displacement will be increased instead of reduced and each part will move in a direction opposite to the direction in which it moves when control rod 64 is moved toward the right, spring 75 providing the force for holding equalizer 70 in contact with the ends of levers 71 and 72.

Equalizer 70 is pivoted to link 68 instead of being rigidly connected thereto for the reason that, since cylinders 50 and 51 are connected in parallel, there is no assurance that both the pistons 46 and 47 will each move through exactly the same distance but it is not necessary that pistons 46 and 47 each move through exactly the same distance as a given variation in motor displacement is determined by the sum of the distances through which the two pistons are moved. Each of pistons 46 and 47 is prevented from moving too far in either direction by suitable stops (not shown) according to the usual practice.

Control rod 64 is connected by a caged spring 76 to one end of a rod 77 having a roller 78 (Fig. 4) journaled upon its other end and arranged in a cam track 79 formed in a cam wheel 80 which is connected by a drive 81 to steering column 12 so that pilot valve V3 will be operated in response to rotation of steering wheel 11 as will presently be explained.

Cam wheel 80 is so connected by drive 81 to steering column 12 that it will be rotated through an angle of 90° when steering wheel 11 is turned far enough to turn rear wheels 7a and 8a at right angles to front wheels 5 and 6.

Cam track 79 includes a long concentric portion 79a which extends through an angular distance of a little more than 180°, a very short concentric part 79b which is diametrically opposite to and has the same radius as part 79a, and two parts 79c and 79d which curve inward from opposite ends of part 79a to points close to part 79b and then slope outward and join the ends of part 79b.

In order that the displacement of motor M1 may be reduced to a predetermined minimum and thereby cause the motor to operate at high speed, an abutment 82 is fixed upon control rod 64 and engaged by the stem of a piston 83 (Fig. 5) which is fitted in a stationary cylinder 84 and forms therewith a servo-motor 85. When servo-motor 85 is energized, it will move control rod 64 toward the right in respect to Fig. 5 against the resistance of caged spring 76 to thereby cause the displacement of motor M1 to be reduced as explained above. Piston 83 and cylinder 84 are so proportioned and cylinder 84 is so located that piston 83 will stall against the end of cylinder 84 when it has moved control rod 64 just far enough to cause the displacement of motor M1 to be reduced to a predetermined minimum such as one-third of maximum displacement.

Liquid for energizing servo-motor 85 is supplied thereto under the control of a valve V4 comprising a valve body 86 and a plunger 87 fitted in body 86 and having its stem connected to a lever 88. Servo-motor 85 is connected by a channel 89 to body 86 at a point spaced from one end thereof. Supply channel 34 is connected to body 86 at a point spaced from channel 89 and an exhaust channel 90 is connected to body 86 at each end thereof.

The arrangement is such that, when valve plunger 87 is shifted to the position shown in Fig. 6, liquid will flow from supply channel 34 through valve body 86 and channel 89 to cylinder 84 and cause piston 83 to move abutment 82 and control rod 64 toward the right in respect to Fig. 5, thereby reducing the displacement of motor 1 as previously explained. When plunger 87 is returned to its neutral position as shown in Fig. 5, caged spring 76 will move abutment 82 and piston 83 toward the left and piston 83 will eject liquid from cylinder 84 through channel 89 and valve body 86 into exhaust channel 90.

The control mechanism for motor M1A is the same as the control mechanism for motor M1 except that it is arranged oppositely thereto, roller 78a on rod 77a being arranged in cam track 79 diametrically opposite roller 78 and channel 89 being connected to a servo-motor 85a. Therefore, as to the parts which appear in Fig. 4, like parts have been indicated by like reference numerals with the exponent "a" added to the reference numerals applied to the control for the motor M1A so that further description thereof is unnecessary.

Main pump P1 may be of any suitable type but it has been indicated as being of the same type as motors M1 and M1A. That is, it has been indicated as being a vane type pump having the same displacement varying mechanism as the motors. Pump P1 may have its displacement reduced by a constant force and increased by a controlled force according to the usual practice but, in order to simplify the drawing and the description, it has been shown as being provided with a control which is the same as that shown in Fig. 5 except that the floating lever 62b, which corresponds to the lever 62 shown in Fig. 5 is connected to a control rod 95 instead of to a control rod 64. Therefore, as to the parts of the control which appear in Fig. 4, like parts have been indicated by like reference numerals with the exponent "b" added to the numerals applied to the control for pump P1 so that a description of the pump control is unnecessary.

The displacement of pump P1 and the speed of engine 30 are regulated in response to operation of a foot pedal 96 which is pivoted to a support 97 by means of a shaft 98. The mechanism for regulating pump P1 and engine 30 in response to operation of pedal 96 is quite complicated but has been simplified in Fig. 4 for the purpose of illustration. At this point it should be emphasized that the drawings are schematic and illustrate the functions of the parts but differ from the actual construction and location of the parts.

As shown, foot pedal 96 has a lever 99 formed integral therewith and connected by a link 100 to a cam wheel 101 which is rotatably supported by a shaft 102. Cam wheel 101 has a cam track 103 formed therein at one side of shaft 102 and a cam track 104 formed upon its periphery at the other side of shaft 102. Cam track 103 has arranged therein a roller 105 which is rotatably supported upon the end of control rod 95. Cam track 104 is engaged by a roller 106 carried by one end of a lever 107 which is pivoted intermediate its ends upon a stationary pin 108. The other end of lever 107 is pivoted to the outer end of a rod 109 which controls the flow of fuel to engine 30. Roller 106 is held in contact with cam track 104 by a spring 110 shown arranged between the block of engine 30 and an abutment 111 which is fixed upon control rod 109.

When cam wheel 101 is in its neutral position as shown, the centers of cam tracks 103 and 104 are on the horizontal centerline of cam wheel 101, cam track 103 is holding pump P1 at zero displacement and cam track 104 is holding engine 30 at idling speed. Cam tracks 103 and 104 are symmetrical about the centers thereof so that the same adjustments of engine 30 and pump P1 will be effected by rotation of cam wheel 101 regardless of the direction of rotation. Preferably, cam tracks 103 and 104 are so shaped that rotation of cam wheel 101 through a short angular distance in either direction will cause engine 30 to be slightly speeded up before the displacement of pump P1 is increased from zero and further rotation of cam wheel 101 will cause the speed of engine 30 and the displacement of pump P1 to be increased simultaneously.

Lever 99 on foot pedal 96 is urged downward by a spring 112 and is engaged by a plunger 113 fitted in a bore 114 formed in support 97. Plunger 113 is urged upward by a spring 115 which is strong enough to overcome the force exerted by spring 112. The upward movement of plunger 113 is limited by nuts 116 which are threaded upon its stem and normally engage the underside of support 97. The arrangement is such that plunger 113 and springs 112 and 115 normally hold pedal 96 in a neutral position as shown in full lines and indicated by the letter "N."

Lever 99 has a switch actuator 117 on the free end theerof to operate a micro-switch S1 which controls operation of reversing valves V2 and V2a. Switch S1 is so located that actuator 117 is in contact therewith when pedal 96 is in its neutral position so that, as soon as pedal 96 starts to rotate in a clockwise direction in respect to Fig. 4, actuator 117 will close switch S1. Actuator 117 is so shaped and of such length that it will hold switch S1 closed when pedal 96 is rotated toward the position shown in dotted lines and indicated by the letter "R."

Selector valve V1 may be of any suitable construction and be operated in any desired manner but for the purpose of illustration it has been shown in Figs. 7 and 8 as including a body 120 having formed therein an axial bore 121 with which channels 35, 36, 37, 38, 39 and 40 communicate, a valve plunger 122 which is fitted in bore 121 to control communication between the several channels and a spring 123 which is arranged in one end of bore 121 and urges plunger 122 toward and normally holds it in the position shown in Fig. 7.

Valve body 120 also has formed therein an axial passage 124 which communicates with the other end of bore 121 and a transverse bore 125 which communicates through passage 124 with bore 121 and has a branch of supply channel 34 and an exhaust channel 126 connected thereto. Communication between passage 124 and each of channels 34 and 126 is controlled by a pilot valve 127 which is fitted in bore 125. Pilot valve 127 is urged toward and normally held in the position shown in Fig. 7 by a spring 128 and it is adapted to be moved to the position shown in Fig. 8 by a solenoid 129 which has its armature connected to the stem of valve 127.

The arrangement is such that, when solenoid 129 is deenergized, passage 124 will be open to exhaust channel 126 and spring 123 will be holding valve plunger 122 in the position shown in Fig. 7 so that liquid discharged by pump P1 may flow through channel 35, bore 121 and channel 39 to reversing valves V2 and V2ª and motors M1 and M1A and the liquid discharged by motors M1 and M1A into reversing valves V2 and V2ª may flow therefrom through channel 40, bore 121 and channel 36 to pump P1. No liquid can escape from the lift apparatus because the ends of channels 37 and 38 are blocked.

When solenoid 129 is energized, it will move pilot valve 127 to the position shown in Fig. 8 which will permit gear pump liquid to flow from channel 34 through bore 125 and passage 124 into bore 121 and move valve plunger 122 to the position shown in Fig. 8 so that liquid discharge by pump P1 may flow through channel 35, bore 121, channel 37 to the lift apparatus and the liquid discharge by the lift apparatus may flow therefrom through channel 38, bore 121 and channel 36 to pump P1. No liquid can escape from motors M1 and M1A because the ends of channels 39 and 40 are blocked.

Reversing valves V2 and V2ª may be of any suitable type and be operated in any desired manner. For the purpose of illustration, valve V2 has been shown in Figs. 9 and 10 as including a body 135 having formed therein an axial bore 136 with which chanels 39, 40, 41 and 42 communicate, a valve plunger 137 which is fitted in bore 136 to control communication between the several channels and a spring 138 which is arranged in one end of bore 136 and urges plunger 137 toward and normally holds it in the position shown in Fig. 9.

Valve body 135 also has formed therein an axial passage 139 which communicates with the other end of bore 136 and a transverse bore 140 which communicates through passage 139 with bore 136 and has a branch of supply channel 34 and an exhaust channel 141 connected thereto. Communication between passage 139 and each of channels 34 and 141 is controlled by a pilot valve 142 which is fitted in bore 140. Pilot valve 142 is urged toward and normally held in the position shown in Fig. 9 by a spring 143 and it is adapted to be moved to the position shown in Fig. 10 by a solenoid 144 which has its armature connected to the stem of valve 142.

The arrangement is such that, when solenoid 144 is deenergized, passage 139 will be open to exhaust channel 141 and spring 138 will be holding valve plunger 137 in the position shown in Fig. 9 so that, if the plunger 122 of valve V1 is in the position shown in Fig. 7, liquid discharge by pump P1 may flow through channel 35, valve V1, channel 39, valve V2 and channel 41 to motor M1 and cause it to operate in a direction to drive the truck forward. The liquid discharged by motor M1 will flow through channels 42, valve V2, channel 40, valve V1 and channel 36 to pump P1.

When solenoid 144 is energized, it will move pilot valve 142 to the position shown in Fig. 10 which will permit gear pump liquid to flow from channel 34 through bore 140 and passage 139 into bore 136 and move valve plunger 137 to the position shown in Fig. 10 so that the liquid in channel 39 may flow therefrom through bore 136 and channel 42 to motor M1 and cause it to operate in a direction to drive the truck rearwardly. The liquid discharged by motor M1 will flow through channel 41 and valve V2 into return channel 40.

Reversing valve V2ª has been shown in Fig. 4 as being turned end for end in respect to valve V2 and as having its pilot valve operated by a solenoid 144ª but it is exactly the same as valve V2 and it functions in the same manner. That is, when solenoid 144ª is deenergized, valve V2ª will direct liquid to motor M1A through channel 41ª which will cause motor M1A to operate in a direction to drive the truck forward and, when solenoid 144ª is energized, valve V2ª will direct liquid to motor M1A through channel 42ª which will cause motor M1A to operate in a direction to drive the truck rearwardly.

In order to simplify the drawing, the exhaust passages connected to the several valves have been shown as discharging into separate reservoirs but actually they all discharge into reservoir 33.

Current for energizing solenoids 129, 144 and 144ª is supplied from a battery B1 (Fig. 4) which has one of its terminals grounded as by being connected to frame 10 of the truck. Solenoid 129 is controlled by a switch S2. Solenoids 144 and 144ª are controlled simultaneously by switch S1 and are controlled selectively by a switch S3 having a movable contact 150 carried by a lever 151 and four stationary contacts 152, 153, 154 and 155 which are engaged selectively by contact 150.

Battery B1 has its other terminal connected by a branched wire 156 to one terminal of switch S1, to one terminal of switch S2 and to contacts 154 and 155 of switch S3. The other contact of switch S1 is connected by wire 157 to contact 150 of switch S3. The other contact of switch S2 is connected by a wire 158 to one end of the winding of solenoid 129 the other end of which is grounded. Contact 152 of switch S3 is connected by a wire 159 to one end of the winding of solenoid 144 the other end of which is grounded. Contact 153 of switch S3 is connected by a wire 160 to one end of the winding of solenoid 144ª the other end of which is grounded.

When switch S2 is closed, solenoid 129 will be energized. When switch S1 is closed, both of solenoids 144 and 144ª will be energized if lever 151 is in its central position as shown in full lines. When lever 151 is swung to the right or left to one of the two positions indicated in dotted lines in Fig. 4, one or the other of solenoids 144 and 144ª will be energized regardless of whether switch S1 is open or closed.

If switch S3 is to be operated solely by the operator as indicated in Fig. 4, it is arranged near the operator's seat, but, switch S3 may be operated automatically in response to rotation of cam wheel 80, as indicated in Fig. 11 in which case lever 151 may be connected by suitable linkage 161 to a hand lever (not shown) arranged near the operator's seat so that switch S3 may also be operated manually if desired.

As shown in Fig. 11, cam wheel 80 has two actuators 162 and 162ª arranged thereon and switch S3 is so located that one or the other of the two actuators will swing lever 151 in one direction or the other in response to rotation of cam wheel 80 in one direction or the other through an angle of substantially 90° from its neutral position. By connecting lever 151 through a linkage 161 to a lever at the operator's seat, the operator may operate switch S3 before cam wheel 80 has been rotated far enough to effect operation of switch S3.

*Operation*

When engine 30 is started and the parts are in the positions shown in Fig. 4, engine 30 will run at idling speed, gear pump P2 will discharge liquid through its relief valve and maintain a low pressure in channel 34 and the displacement of pump P1 will be zero so that the truck is stationary.

If foot pedal 96 is then rotated in a counter-clockwise direction, lever 99 and link 100 will rotate cam wheel 101. Cam track 104 will move roller 106 outward to increase the speed of engine 30 and cam track 103 will move roller 105 and control rod 95 toward pump P1 which will cause the displacement of pump P1 to be increased from zero in the same manner that moving control rod 64 toward motor M1 causes the displacement of motor M1 to be increased as previously explained.

Pump P1 will then deliver liquid through channel 35, valve V1, channel 39, valves V2 and V2$^a$, and channels 41 and 41$^a$ to motors M1 and M1A and cause them to drive the truck forward. Further rotation of foot pedal 96 will further increase the displacement of pump P1 and the speeds of engine 30 and pump P1 until pedal 96 has been rotated into the position shown in dotted lines and indicated by the letter "F" at which time engine 30 is at full speed, pump P1 is at maximum displacement and the truck is being driven at the maximum speed within the low speed range.

If a higher speed of the truck is desired, lever 88 may be operated to shift the plunger 87 of valve V4 to the position shown in Fig. 6. Then liquid will flow from supply channel 34 through valve V4 and channel 89 to servomotors 85 and 85$^a$ and cause them to move control rods 64 and 64$^a$ against the resistances of caged springs 76 and 76$^a$ and thereby reduce the displacements of motors M1 and M1A as previously explained. Then the speed of the truck may be varied through the high speed range by rotating foot pedal 96 toward and from the position indicated by the letter "F". If it is then desired to operate the truck in the low speed range, lever 88 is operated to return plunger 87 of valve V4 to its normal position as shown in Fig. 5 so that liquid can escape from servomotors 85 and 85$^a$ and permit caged springs 76 and 76$^a$ to return control rods 64 and 64$^a$ to their normal positions and thereby cause the displacements of motors M1 and M1A to be increased to maximum as previously explained.

As the truck moves forward, it may be turned in one direction or the other by rotating steering wheel 11, thereby causing rotation of cam wheel 80. Rollers 78 and 78$^a$ are arranged in cam track 79 diametrically opposite each other and are in the end portions of concentric part 79$^a$ when the rear wheels of the truck are parallel to the front wheels thereof. Since concentric part 79$^a$ extends through slightly more than 180° rollers 78 and 78$^a$ will not be moved radially of cam wheel 80 when steering wheel 11 is turned slightly as the truck is steered along a nearly straight path. But when steering wheel 11 is turned far enough in a direction to rotate cam wheel 80 through a substantial angle in a counterclockwise direction in respect to Fig. 4 to thereby turn the truck through a substantial angle, roller 78 will enter cam track part 79$^c$ which will cause roller 78 to pull rods 77 and 64 toward the center of cam wheel 80 and thereby effect a reduction in the displacement of motor M1 in the previously described manner. Roller 78$^a$ will remain in concentric cam track part 79$^a$ so that the displacement of motor M1A is not reduced.

Turning steering wheel 11 in counterclockwise direction will cause the truck to turn in such a direction that front wheel 5, which is driven by motor M1, is on the inside of the turn. Reducing the displacement of motor M1 reduces the torque exerted by motor M1 and enables motor M1A, which remains at full displacement, to exert upon outside wheel 6 a torque which is greater than the torque exerted upon inside wheel 5 by motor M1. Applying to the outside wheel a greater torque than is applied to the inside wheel assists the operator in steering the truck.

When steering wheel 11 is turned far enough to turn the rear wheels at right angles to the front wheels, cam wheel 80 will be rotated 90° which will cause roller 78 to be moved radially outward into concentric cam track part 79$^b$. Roller 78 will move rods 77 and 64 toward the right in respect to Fig. 4 which will cause the displacement of motor M1 to be increased to maximum as previously explained.

Just as or just before roller 78 passes from cam track part 79$^c$ into cam track part 79$^b$, lever 151 of switch S3 is shifted in a direction to cause contact 150 to connect contact 152 to contact 154. If switch S3 is arranged as indicated in Fig. 4, lever 151 is operated by the operator. If switch S3 is arranged as indicated in Fig. 11, lever 151 is operated automatically by actuator 162 or it may be operated manually before actuator 162 engages lever 151. Connecting contact 152 to contact 154 establishes a circuit to energize solenoid 144 which will cause the plunger 137 of valve V2 to assume the position shown in Fig. 10 as previously explained. With valve plunger 137 in the position shown in Fig. 10, liquid will flow from channel 39 through valve V2 and channel 42 to motor M1 which will thus be reversed and will drive front wheel 5 in the opposite direction and thereby cause the truck to spin about the center of front axle 9.

The truck may be turned completely around or through any desired angle. When the truck has been turned far enough, steering wheel 11 and lever 151 are returned to their normal position which will cause cam wheel 80 to be returned to its normal position and solenoid 144 to be deenergized and permit the parts of valve V2 to be returned to their normal positions.

When steering wheel 11 is turned far enough in a direction to rotate cam wheel 80 through a substantial angle in a clockwise direction from the position shown in Fig. 4, the drive will operate in the above described manner but cam track portion 79$^d$ will move roller 78$^a$ toward the center of cam wheel 80 to reduce the displacement of motor M1A and, if cam wheel 80 is rotated through 90° from its normal position, roller 78$^a$ will be moved outward as it passes from cam track part 79$^d$ into cam track part 79$^b$ which will cause the displacement of motor M1A to be increased to maximum and at the same time lever 151 of switch S3 is shifted, either manually or automatically to connect contact 153 to contact 155 and thereby establish a circuit to energize solenoid 144a which will cause valve V2$^a$ to operate and reverse motor M1A.

When the parts are in the positions shown in Fig. 4. the track may be driven rearwardly by rotating foot pedal 96 toward the position shown in dotted lines and indicated by the letter "R." As soon as pedal 96 starts to rotate, actuator 117 on lever 99 will close switch S1 which will establish circuits to energize solenoids 144 and 144$^a$, thereby causing the plunger 137 of valves V2 and V2$^a$ to be shifted to the positions shown in Fig. 10. Rotation of pedal 96 will cause pump P1 to discharge liquid through channel 35, valve V1 and channel 39 at the rate determined by the angular distance through which pedal 96 is rotated from its neutral position as previously explained. But with valves V2 and V2$^a$ shifted, the liquid discharged into channel 39 will flow through valves V2 and V2$^a$ and channels 42 and 42$^a$ into motors M1 and M1A and cause them to drive the truck rearward.

The drive illustrated and described herein may be modified in various ways and adapted to various vehicles without departing from the scope of the invention which is hereby claimed as follows:

1. A drive for a vehicle having a body, a plurality of wheels for supporting said body and including a pair of driving wheels, and means for steering said vehicle including a steering wheel; said drive comprising two hydraulic motors each of which is connected to one of said driving wheels and has means for varying its displacement, means for supplying motive liquid to both of said motors to enable the same to rotate said driving wheels, a cam wheel having a cam track thereon, means for rotating said cam wheel in response to rotation of said steering wheel, control means for effecting operation of the displacement varying means of each of said motors and including an element for adjusting said control, and a cam follower carried by each of said elements and engaging said cam track to cause said elements to adjust said control means in response to rotation of said cam wheel; said cam track being so shaped that during rotation of said cam wheel in either direction from a neutral position said track will hold the element of the control means for one of said motors stationary and will move the element of the control means for the others of said motors in a direction to cause that control means to effect a reduction in the displacement of said other motor.

2. A drive according to claim 1 in which each of said cam followers is connected to one of said elements by means including yieldable means and which includes two hydraulic servo-motors for moving said elements respectively against the resistances of said yieldable means and each having a limited stroke of such length that when energized said servo-motors will move both of said elements just far enough to cause said control means to effect a reduction in the displacement of each of said motors to a predetermined minimum, a source of pressure liquid, and means including a valve for connecting both of said servo-motors to said source and to exhaust alternatively.

3. A drive for a vehicle having a body, a plurality of wheels for supporting said body and including a pair of driving wheels, and means for steering said vehicle including a steering wheel; said drive comprising two hydraulic motors each of which is connected to one of said driving wheels and has means for varying tis displacement, means for supplying motive liquid to both of said motors to enable the same to rotate said driving wheels, a cam wheel having a cam track thereon, means for rotating said cam wheel in response to rotation of said steering wheel, follow-up control means for effecting operation of the displacement varying means of each of said motors, two control rods each of which is connected at one of its ends to one of said control means, and two cam followers carried by the other ends of said rods respectively and engaging said cam track at points diametrically opposite each other; said cam track being so shaped that during rotation of said cam wheel in either direction from a neutral position said track will hold the rod of the control means for one of said motors stationary and will move the rod of the control means for the other of said motors in a direction to cause that control means to effect a reduction in the displacement of said other motor.

4. A drive according to claim 3 in which each of said control rods includes a first part having one end thereof connected to one of said control means, a second part having one of said cam followers on one end thereof and yieldable means connecting the other ends of said parts to each other, and which includes two hydraulic servo-motors for moving said first parts respectively against the resistance of said yieldable means and each having a limited stroke of such length that when energized said servo-motors will move both of said first parts just far enough to cause said control means to effect a reduction in the displacement of each of said motors to a predetermined minimum, a source of pressure liquid, and means including a valve for connecting both of said servo-motors to said source and to exhaust alternatively.

5. A drive for a vehicle having a body, a pair of driving wheels rotatable upon an axis which is stationary in respect to said body, at least one other wheel rotatable upon an axis which may be turned through an angle of at least 90° in respect to the axis of said driving wheels and means including a steering wheel for turning the axis of said other wheel in respect to the axis of said driving wheel to thereby steer said vehicle, said drive comprising two hydraulic motors each of which is connected to one of said driving wheels and has means for varying its displacement, means including a pump for supplying motive liquid to said motors to enable the same to rotate said driving wheels, means for connecting said pump to said motors, a cam wheel having a cam track thereon, means responsive to rotation of said steering wheel for rotating said cam wheel through an angular distance equal to the angle through which the axis of said other wheel is turned in response to rotation of said steering wheel, control means for effecting operation of the displacement varying means of each of said motors and including an element for adjusting said control, and a cam follower carried by each of said elements and engaging said cam track to cause said elements to adjust said control means in response to rotation of said cam wheel; said cam wheel being in a neutral position when said other wheel is parallel or nearly parallel to said driving wheels and said cam track being so shaped that it will hold both of said elements stationary in such positions as to cause said control means to maintain the displacements of said motors at maximum when said cam wheel is in said neutral position, it will hold the element of the control means for one of said motors in said stationary position during rotation of said cam wheel in either direction from its neutral position, it will move the element of the control means for the other of said motors in a direction to cause that control means to effect a reduction in the displacement of said other motor during rotation of said cam wheel through an angle of nearly 90° from its neutral position, and during further rotation of said cam wheel to a position 90° from its neutral position said cam track will move the element of the control means for said other motor far enough in the opposite direction to cause that control means to effect an increase in the displacement of said other motor to maximum.

6. A drive according to claim 5 in which each of said cam followers is connected to one of said elements by means including yieldable means, and which includes two hydraulic servomotors for moving said elements respectively against the resistances of said yieldable means and each having a limited stroke of such length that when energized said servomotors will move both of said elements just far enough to cause said control means to effect a reduction in the displacement of each of said motors to a predetermined minimum, a source of pressure liquid, and means including a valve for connecting both of said servomotors to said source and to exhaust alternatively.

7. A drive for a vehicle having a body, a plurality of wheels for supporting said body and including a pair of driving wheels, and means for steering said vehicle including a steering wheel; said drive comprising two variable displacement hydraulic motors each of which is connected to one of said driving wheels, means for supplying motive liquid to both of said motors to enable the same to rotate said driving wheels, a cam wheel having a cam track thereon, means for rotating said cam wheel in response to rotation of said steering wheel, a source of pressure liquid, and means for varying the displacement of each of said motors including hydraulic servomotor means adapted when supplied with pressure liquid to reduce motor displacement and to increase motor displacement when connected to exhaust, a valve body connected to said source and to exhaust, a channel connecting said valve body to said servomotor means, a pilot valve arranged in said body and normally occupying a neutral position in which it blocks said channel but being shiftable in one direction or the other to connect said servomotor means to said source or to exhaust, a floating lever having one end thereof pivoted to said pilot valve, a follow-up linkage connecting the other end of said lever to said servomotor means, and a control rod having one of its ends pivoted to said lever intermediate the ends thereof and its other end provided with a cam follower which engages said cam track so that rotation of said cam wheel will cause said rod to swing said lever upon said linkage and shift said pilot valve from its neutral position to thereby effect operation of said servo-motor means and operation of said servomotor means will cause said linkage to swing said lever upon said control rod and return said pilot valve to its neutral position.

8. A drive according to claim 7 in which said control rod includes a first part having one of its ends connected to said floating lever, a second part having said cam follower on one of its ends and yieldable means connecting the other ends of said parts to each other, and which includes a hydraulic servomotor for moving said first part against the resistance of said yieldable means in a direction to effect a reduction in motor displacement and having a limited stroke of such length that when energized said servomotor will move said first part just far enough to effect a reduction in motor displacement to a predetermined minimum, and means including a valve for connecting said servomotor to said source and to exhaust alternatively.

9. A drive according to claim 5 in which said means for connecting said pump to said motors includes a reversing valve connected between each of said motors and said pump, and which includes means for shifting each of said valves to thereby reverse the motor to which that valve is connected, and means responsive to rotation of said cam wheel in either direction to a position approximately 90° from its neutral position for effecting operation of one or the other of said valve shifting means.

10. In a hydraulic drive, the combination of a hydraulic motor for connection to an element to drive the same and having means for varying its displacement, means connected to said motor for supplying motive liquid thereto to enable it to drive said element, a control connected to said displacement varying means for effecting operation thereof and having a member connected thereto, means for adjusting said member to selected positions, means connecting said adjusting means to said member and including a caged spring, a hydraulic servomotor engaging said member for moving the same against the resistance of said spring and having a limited stroke of such a length that when energized said servomotor will move said member just far enough to cause said control to effect a reduction in the displacement of said motor to a predetermined minimum, a source of pressure liquid, and a valve connected to said source and to said servomotor and operable to connect said servomotor to said source and to exhaust alternatively.

11. A drive for a vehicle having a plurality of wheels, said drive comprising hydraulic motor means for driving said vehicle connected to at least one of said wheels and having means for varying its displacement, means connected to said motor means for supplying motive liquid thereto to enable the same to rotate said wheel, follow-up control means for effecting operation of said displacement varying means connected thereto, at least one control rod connected to said control means for operating the same and including a first part and a second part and yieldable means connecting said parts to each other, means connected to said second part for moving it into and holding it in selected positions, a hydraulic servomotor engaging said first part for moving the same against the resistance of said yieldable means and having a limited stroke of such a length that when energized said servomotor will move said first part just far enough to cause said control means to effect a reduction in the displacement of said motor means to a predetermined minimum, a source of pressure liquid, and a valve connected to said servomotor and said source and operable to connect said servomotor to said source and to exhaust alternatively.

12. A drive for a vehicle having a pair of driving wheels, said drive comprising a hydraulic motor connected to each of said wheels and having means for varying its displacement, means connected to both of said motors for supplying motive liquid thereto to enable the same to rotate said wheels, control means for effecting operation of the displacement varying means of each of said motors connected thereto and including an element for adjusting said control, a device for moving said elements into adjusted positions, a linkage including yieldable means for connecting each of said elements to said device, two hydraulic servomotors engaging said elements respectively for moving the same against the resistances of said yieldable means and each having a limited stroke of such length that when energized said servomotors will move both of said elements just far enough to cause said control means to effect a reduction in the displacement of each of said motors to a predetermined minimum, a source of pressure liquid, and a valve connected to said servomotors and said source and operable to connect both of said servomotors to said source and to exhaust alternatively.

13. A drive for a vehicle having a pair of driving wheels, said drive comprising a hydraulic motor connected to each of said wheels and having means for varying its displacement, means connected to both of said motors for supplying motive liquid thereto to enable the same to rotate said wheels, follow-up control means connected to the displacement varying means of each of said motors for effecting operation thereof, a control rod connected to each of said control means for operating the same and including a first part and a second part and yieldable means connecting said parts to each other, a device connected to said second parts for moving the same into selected positions, two hydraulic servomotors engaging said first parts respectively for moving the same against the resistances of said yieldable means and each having a limited stroke of such length that when energized said servomotors will move both of said first parts just far enough to cause said control means to effect a reduction in the displacement of each of said motors to a predetermined minimum, a source of pressure liquid, and a valve connected to said servomotors and said source and operable to connect both of said servomotors to said source and to exhaust alternatively.

References Cited in the file of this patent
UNITED STATES PATENTS

| | | |
|---|---|---|
| 901,055 | Allen | Oct. 13, 1908 |
| 2,161,439 | Thoma | June 6, 1939 |
| 2,177,097 | Doe et al. | Oct. 24, 1939 |
| 2,246,018 | Snyder | June 17, 1941 |
| 2,320,727 | Herman et al. | June 1, 1943 |
| 2,393,324 | Joy | Jan. 22, 1946 |
| 2,478,481 | Griffith | Aug. 9, 1949 |
| 2,516,662 | Vickers et al. | July 25, 1950 |
| 2,547,578 | Holmes | Apr. 3, 1951 |
| 2,588,866 | Moon | Mar. 11, 1952 |
| 2,598,538 | Haynes | May 27, 1952 |